US009258395B2

(12) United States Patent
Schmidt

(10) Patent No.: US 9,258,395 B2
(45) Date of Patent: Feb. 9, 2016

(54) CADUCEUS-STYLE COIL FOR REDUCTION OF RADIATION AND PRODUCTION OF LONGITUDINAL WAVES

(71) Applicant: LIFEWAVE, INC., San Diego, CA (US)

(72) Inventor: David G. Schmidt, Poway, CA (US)

(73) Assignee: LIFEWAVE, INC., San Diego, CA (US)

( * ) Notice: Subject to any disclaimer, the term of this patent is extended or adjusted under 35 U.S.C. 154(b) by 202 days.

(21) Appl. No.: 13/754,615

(22) Filed: Jan. 30, 2013

(65) Prior Publication Data

US 2014/0106812 A1   Apr. 17, 2014

Related U.S. Application Data

(60) Provisional application No. 61/795,221, filed on Oct. 13, 2012.

(51) Int. Cl.
| | |
|---|---|
| *H01Q 1/24* | (2006.01) |
| *H01Q 9/27* | (2006.01) |
| *H01Q 1/52* | (2006.01) |
| *H04M 1/02* | (2006.01) |
| *H04B 1/3827* | (2015.01) |

(52) U.S. Cl.
CPC ............ *H04M 1/026* (2013.01); *H01Q 1/245* (2013.01); *H01Q 1/52* (2013.01); *H01Q 1/526* (2013.01); *H01Q 9/27* (2013.01); *H04B 1/3838* (2013.01)

(58) Field of Classification Search
CPC .......... H01Q 1/52; H01Q 1/526; H01Q 1/24; H01Q 1/241; H01Q 1/242; H01Q 1/243; H01Q 1/245; H01Q 9/27
USPC ........................................................ 343/841
See application file for complete search history.

(56) References Cited

U.S. PATENT DOCUMENTS

| | | | | |
|---|---|---|---|---|
| 6,855,883 | B1 * | 2/2005 | Matsui ........................ | 174/393 |
| 7,456,793 | B2 * | 11/2008 | Napoles et al. ............. | 343/702 |
| 7,701,408 | B2 * | 4/2010 | Bombay et al. ............ | 343/841 |
| 2003/0011530 | A1 * | 1/2003 | Lin .............................. | 343/895 |
| 2006/0132363 | A1 * | 6/2006 | Neergaard et al. ......... | 343/702 |
| 2010/0001917 | A1 * | 1/2010 | Manasson et al. ......... | 343/785 |

FOREIGN PATENT DOCUMENTS

WO       WO 02095867 A1  *  11/2002

* cited by examiner

*Primary Examiner* — Dameon E Levi
*Assistant Examiner* — Jennifer F Hu
(74) *Attorney, Agent, or Firm* — Sheppard, Mullin, Richter & Hampton, LLP

(57) ABSTRACT

Systems, devices, and methods reduce or attenuate electromagnetic radiation emitted by a wireless client device, e.g. a cellphone or tablet computing device, such that less electromagnetic radiation impinges on a user of the wireless client device. The electromagnetic radiation as measured at or near the front of the wireless client device may be reduced during use by about 90%.

9 Claims, 10 Drawing Sheets

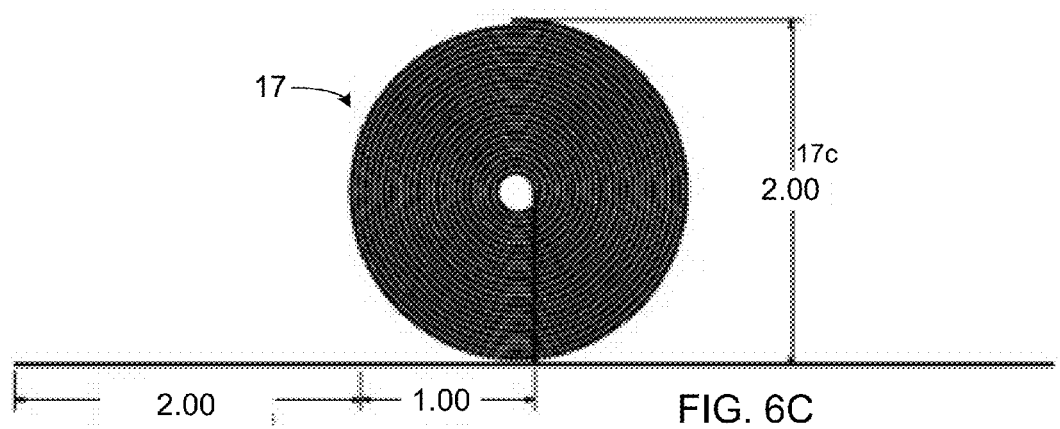
FIG. 6C
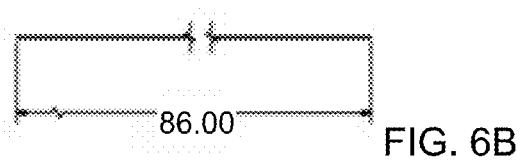
FIG. 6B
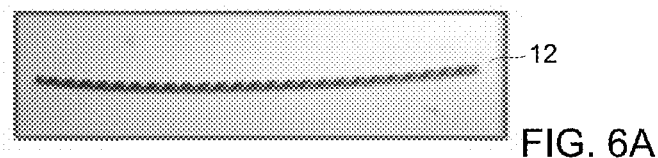
FIG. 6A
FIG. 6

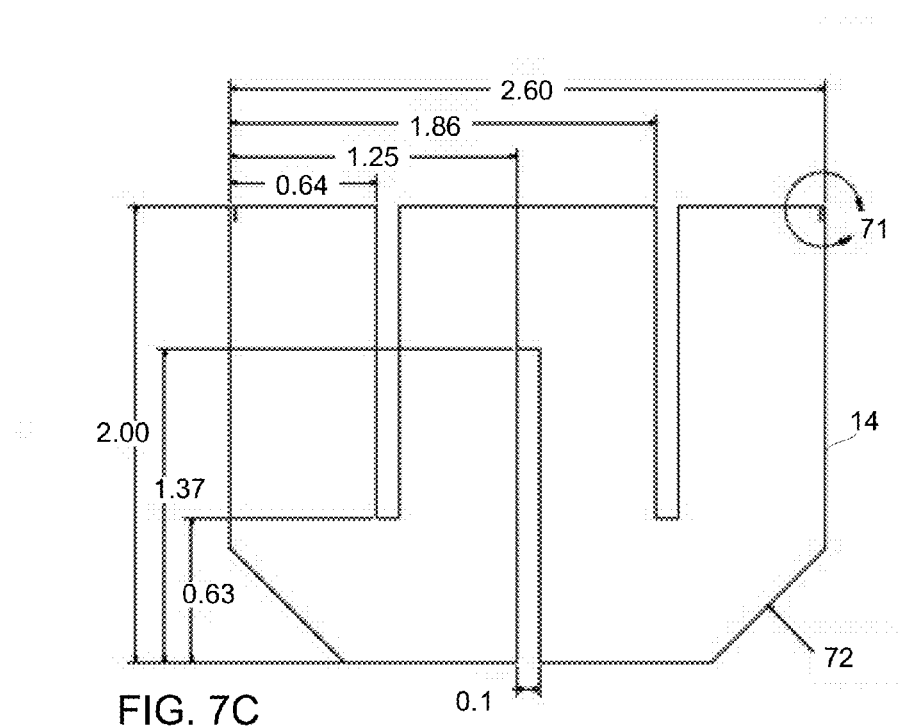
FIG. 7C
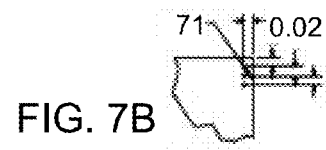
FIG. 7B
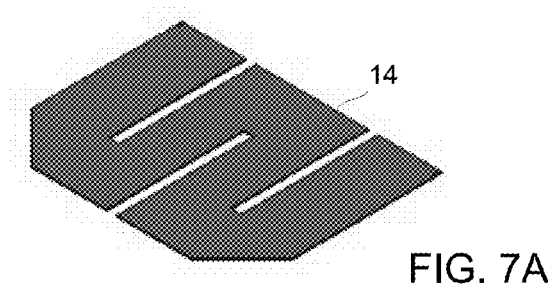
FIG. 7A
FIG. 7

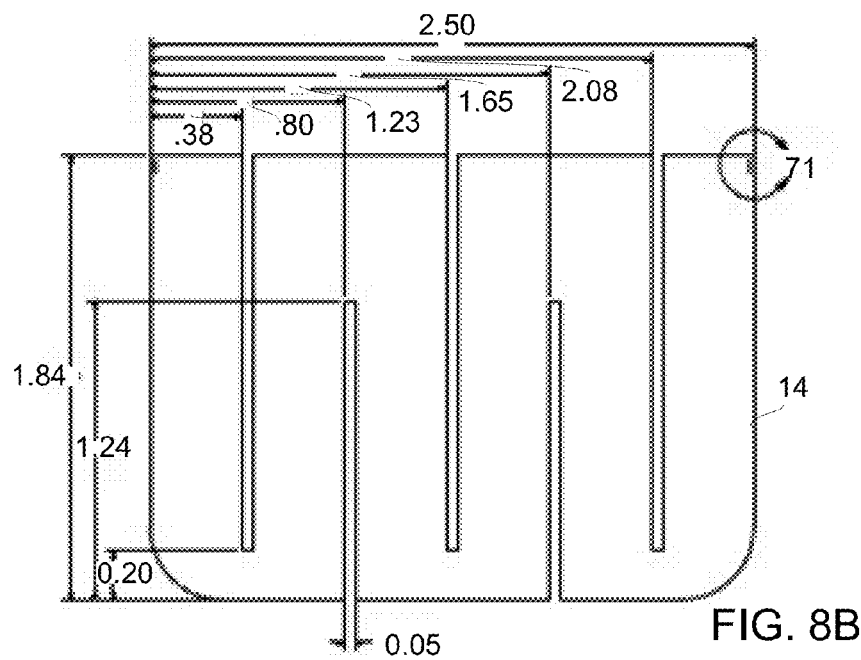
FIG. 8B
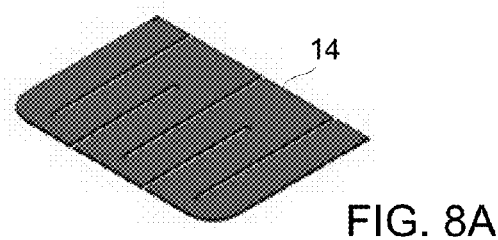
FIG. 8A
FIG. 8

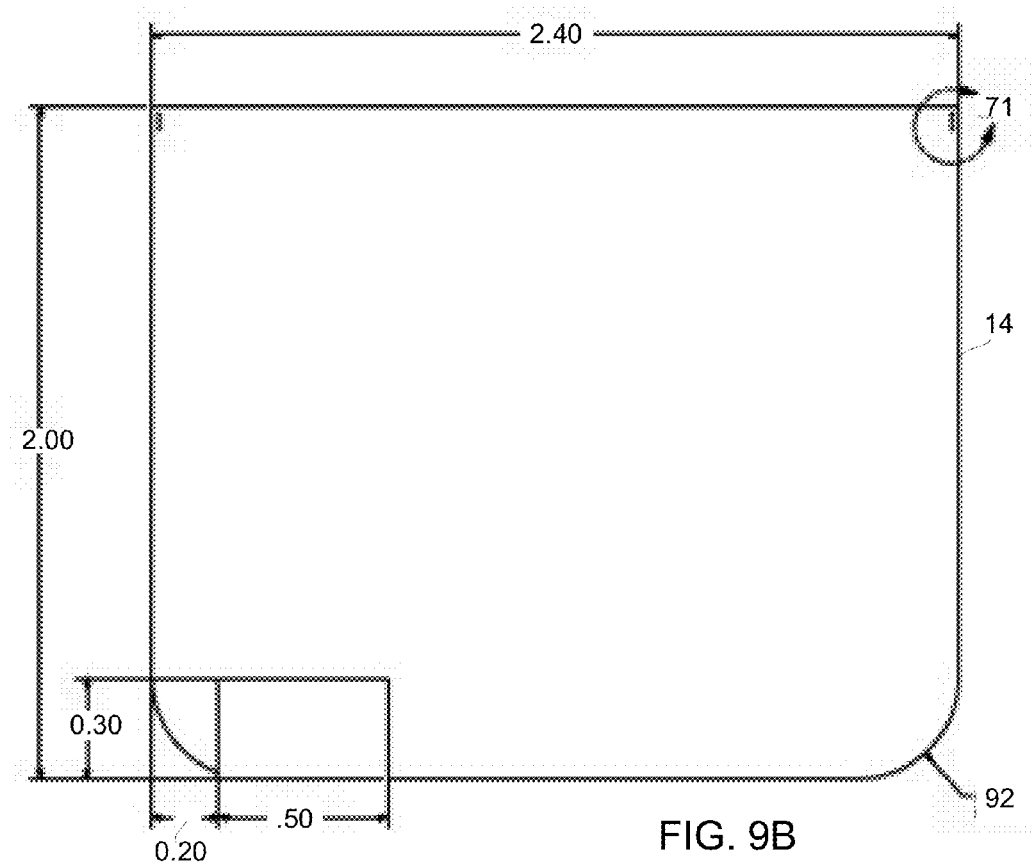
FIG. 9B
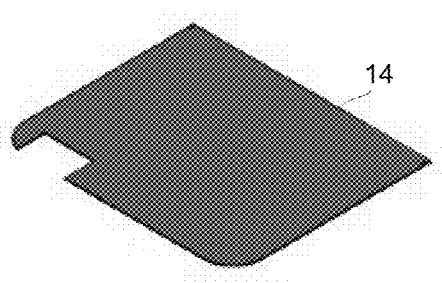
FIG. 9A
FIG. 9

CADUCEUS-STYLE COIL FOR REDUCTION OF RADIATION AND PRODUCTION OF LONGITUDINAL WAVES

RELATED APPLICATIONS

This application claims priority to U.S. Patent Application Ser. No. 61/795,221, entitled "Caduceus—style coil with associated hardware that has applications in radiation reduction and production of longitudinal waves," and filed Oct. 13, 2012. This application is hereby incorporated by reference into the present application in its entirety.

FIELD OF THE INVENTION

The invention relates to a system to shield a user from electromagnetic radiation emitted by wireless devices, including but not limited to cell phones and other client devices, so that at least some of the emitted electromagnetic radiation does not impinge on the user of those wireless devices. The invention also relates to methods of operation or manufacture of these systems.

BACKGROUND OF THE INVENTION

It is known that electronic and/or wireless devices, including cell phones, emit electromagnetic radiation during operation. It is known that at least some emitted electromagnetic radiation impinges on the users of the devices. It is known that impingement of electromagnetic radiation may be undesirable under certain circumstances. It is known that electromagnetic radiation may be attenuated by various mechanisms, including absorption, deflection, and/or other mechanisms.

SUMMARY

One aspect of the invention relates to a system configured to shield a user from electromagnetic radiation emitted by a wireless device. The wireless device may include a mobile telecommunications device, such as a cell phone, and/or the functionality thereof. The wireless device may include wireless (local area) networking functionality, for example through Wi-Fi™. The wireless device may be integrated, combined, embedded, and/or operating conjunctively with a mobile telephone, tablet computing device, gaming device, and/or other electronic device. As used herein, the term "wireless client device" may be used interchangeably with the term "wireless device."

In the context of this disclosure, "shield," "shielding," and variations thereof refer to a reduction in the amount of electromagnetic radiation impinging, e.g., on a user. This reduction may be quantified as an attenuation of a particular number of decibels, as a percentage, and/or in other ways. The attenuation may vary within a range of frequencies of the electromagnetic radiation. In other words, the specific attenuation may depend on characteristics of the electromagnetic radiation, including frequency or frequency range. The specific attenuation may be measured under various operating conditions, including but not limited to stand-by mode, telephonic usage, data transfer, and/or other modes of operation. The specific attenuation may be measured in different positions and/or locations, including but not limited to at or near the front of the wireless device, at or near the back of the wireless device, at a predetermined distance from the front or back of the wireless device, and/or relative to other positions and/or locations. For example, the predetermined distance may correspond to the average distance users hold a telephone from their ear, face, and/or head, or in other words, about 1 inch, about 2 inches, about 3 inches, about 4 inches, about 6 inches, about 8 inches, about 10 inches, about 12 inches, and/or other predetermined distances.

The pertinent range of frequencies of the electromagnetic radiation targeted for shielding depends on the specific telecommunication services and/or telecommunication standards used by the wireless devices. The predominant range of frequencies to shield may be between about 400 MHz and about 2.5 GHz (or any sub-range within these limits). In the context of this disclosure, a "predominant" range of frequencies refers to a frequency range that includes the intended telecommunications signal, and/or a frequency range that includes the majority of the amount of energy within the emitted electromagnetic radiation. Any one particular telecommunications standard may only cover a portion of this range. For example, the Universal Mobile Telecommunications System (UMTS) frequency band as used in the United States may be 1710-1755 MHz and 2110-2155 MHz for uplink and downlink, respectively. Note that the specific frequency bands used may vary across operators/carriers, and may vary between different geographic locations.

Reduction of electromagnetic radiation emitted by a wireless device may be considered in relation to the amount of electromagnetic radiation that impinges on a user of the wireless device. Reduction of electromagnetic radiation may be accomplished through various mechanisms, including but not limited to absorption, deflection, reception, (re)transmission, and/or other mechanisms to reduce the amount of electromagnetic radiation that impinges on the user of the wireless device.

Reduction of emitted electromagnetic radiation may be accomplished through a system that includes one or more of a carrier structure, a receiver, a transmitter, and/or other components.

The receiver and/or the transmitter may be carried by the carrier structure. The carrier structure may be configured to be removably installed on the wireless device. In some implementations, the carrier structure may include a laminate and/or other layer of plastic material. For example, the receiver and/or transmitter may be encased and/or laminated in a layer of plastic material that functions as the carrier structure. In some implementations, the carrier structure may be arranged and/or disposed at or near the back of a wireless device. For example, the carrier structure may be configured to fit between the wireless device and a protective cover and/or case of the wireless device, such as the cover of a smartphone.

The receiver may be arranged and/or disposed at or near the back of a wireless device. The receiver may be carried by the carrier structure. In some implementations, the receiver and/or the carrier structure may include peripheral portions that may be arranged at or near one or more lateral sides (or segments thereof) of the wireless device. In some implementations, the system may include holes, gaps, cutouts, and/or other open spaces for one or more components of the wireless device. For example, these components may need to be accessible and/or unblocked, such as, by way of non-limiting example, buttons, switches, screens, control interface components, speakers, cameras, antennas, and/or other components. It is noted that the number of these components and the placement thereof may vary between models and brands of wireless devices, such that, e.g., a newly-released model of a particular smartphone could be used with a system configured to shield a user from electromagnetic radiation having specific dimensions, peripheral portions, cut-outs, holes, and/or other device-dependent and/or model-dependent characteristics.

The receiver may be configured to receive electromagnetic radiation emitted by the wireless device. In some implementations, the receiver may include a metallic mesh. The receiver may be configured to convert received electromagnetic radiation into an electromagnetic signal. In some implementations, the metallic mesh included in the receiver may span across the width (and/or any other dimension) of the wireless device. In some implementations, the metallic mesh included in the receiver may cover the lower (back) portion of the wireless device. For example, the receiver may cover the lower 25%, 30%, 40%, 50%, 60%, 70%, 75%, or another suitable portion of the wireless device such that user operation and/or interaction may not be unduly obstructed. In some implementations, the receiver may be opaque, such that it may be advisable to prevent covering components, including but not limited to a display, of the wireless device that present information to the user, in particular graphical information.

The transmitter may be arranged and/or disposed at or near the back of the wireless device. The transmitter may be carried by the carrier structure. In some implementations, the transmitter and/or the carrier structure may include peripheral portions that may be arranged at or near one or more lateral sides (or segments thereof) of the wireless device. In some implementations, the system may include holes, gaps, cut-outs, and/or other open spaces for one or more components of the wireless device. For example, these components may need to be accessible and/or unblocked, such as, by way of non-limiting example, buttons, switches, screens, control interface components, speakers, cameras, antennas, and/or other components. It is noted that the number of these components and the placement thereof may vary between models and brands of wireless devices, such that, e.g., a newly-released model of a particular smartphone could be used with a system configured to shield a user from electromagnetic radiation having specific dimensions, peripheral portions, cut-outs, holes, and/or other device-dependent and/or model-dependent characteristics.

The transmitter may be electrically coupled with the receiver such that one or more electrical couplings exist between the transmitter and the receiver. Electromagnetic signals may be transferred between the receiver and the transmitter. The transmitter may be configured to receive electromagnetic signals and/or electromagnetic radiation from the receiver. The transmitter may be configured to transmit electromagnetic signals and/or electromagnetic radiation. For example, the transmitter may be configured to transmit electromagnetic signals and/or electromagnetic radiation received by the transmitter from the receiver. The transmitter may be configured to transmit electromagnetic signals and/or electromagnetic radiation in a particular direction. For example, the particular direction may be chosen such that transmissions from the transmitter may be substantially away from the user of the wireless device. As used herein, "substantially away" may be used to indicate a direction of the majority of a signal, a wave, or the energy thereof.

The transmitter may include one or more electrically conducive wires. In some implementations, the transmitter includes one or more pairs of wires. In some implementations, the transmitter may include one or more trios, triplets, and/or threesomes of wires. A pair of wires may include a first and a second wire. A trio, triplet, or threesome of wires may include a first, second, and third wire. Individual ones of the pairs of wires may be twisted around each other. In other words, the first and second wires of a pair of wires may be twisted around each other. In some implementations, the transmitter may include one or more pairs of twisted wires. Individual ones of the pairs of twisted wires may be spirally wound to form a coil. For example, the formed coil may be in a shape of a flat spiral. As used herein, the term "flat" may be used for shapes and/or structures arranged in or extending along a two-dimensional plane, apart from the third dimension inherent in the material used for the shape or structure. For example, the spirally wound wire of a so-called pancake coil may be considered to be flat.

In some implementations, one or more peripheral portions of the receiver, the transmitter, and/or the carrier structure may be arranged and/or folded such that a portion of one or more lateral sides and/or the front side of the wireless device may be covered. It is noted that portions of the front side of the electronic device that are used for user interaction may need to remain uncovered by the system. For example, if the wireless device includes a touch screen that substantially covers the entire front side, then the system (in particular the receiver and/or the carrier structure) may be arranged to be disposed at or near the backside and/or one or more lateral sides rather than the front side.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

BRIEF DESCRIPTION OF THE DRAWINGS

FIG. 6 illustrates, through constituent FIGS. 6A, 6B, and 6C, details of a coil in accordance with one or more embodiments.

FIG. 7 illustrates, through constituent FIGS. 7A, 7B, and 7C, an exemplary embodiment of a receiver, and/or details thereof.

FIG. 8 illustrates, through constituent FIGS. 8A and 8B, an exemplary embodiment of a receiver, and/or details thereof.

FIG. 9 illustrates, through constituent FIGS. 9A and 9B, an exemplary embodiment of a receiver, and/or details thereof.

DETAILED DESCRIPTION

Impingement (on users) of electromagnetic radiation emitted by wireless devices, including mobile telephones, may be undesirable under certain circumstances.

Figure 1:
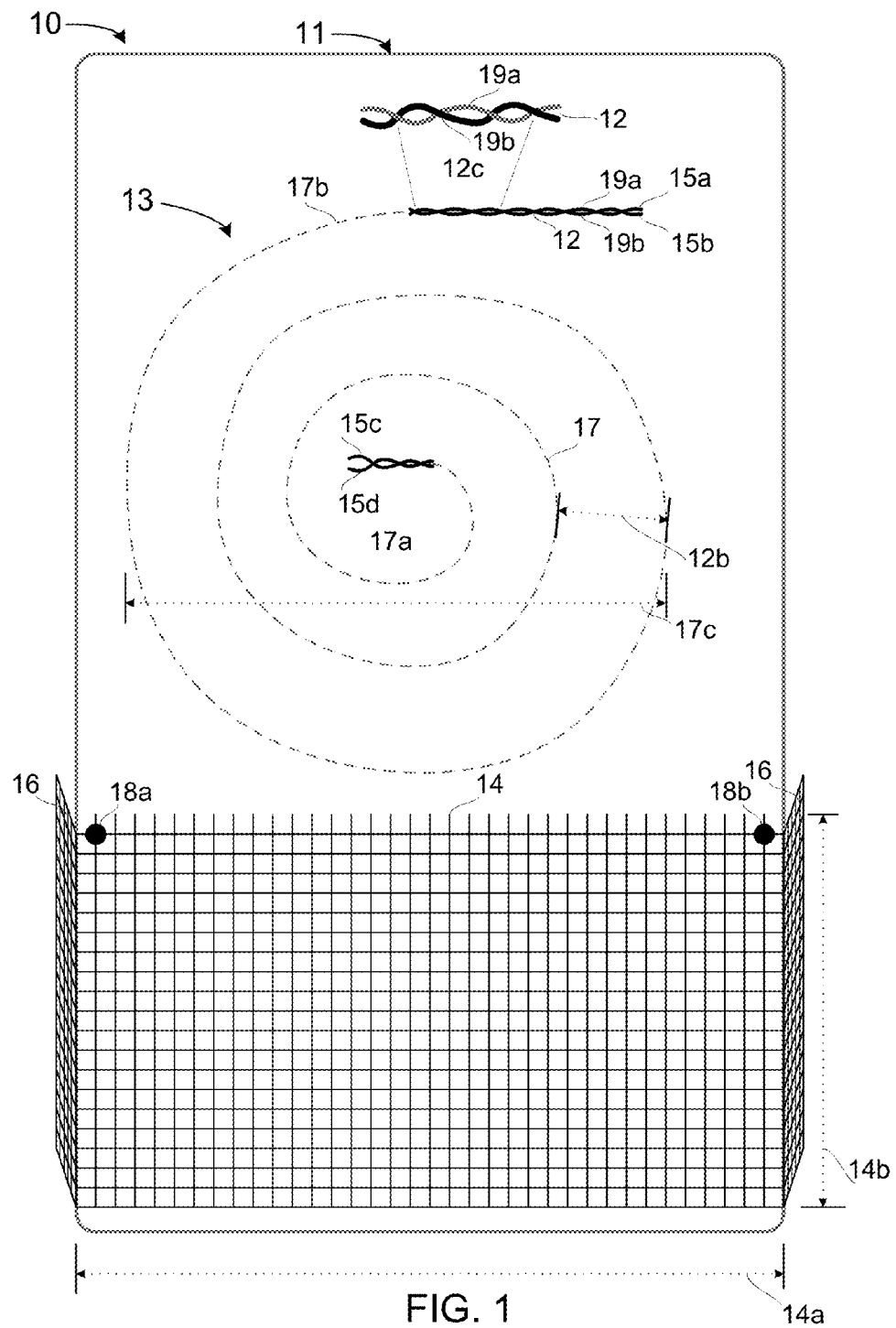
FIG. 1 schematically illustrates a system configured to shield electromagnetic radiation emitted from a wireless device.

FIG. 1 schematically illustrates a system 10 configured to shield electromagnetic radiation emitted by a wireless device (not shown in FIG. 1). The wireless device may have a front side, backside, and one or more lateral sides. System 10 may have a front side, backside, and one or more lateral sides. By way of non-limiting example, system 10 may be configured to shield a user from electromagnetic radiation emitted by an iPhone™ 4S™ or similar mobile telephone/smartphone.

Shielding, by system 10, of electromagnetic radiation emitted by a wireless device may be quantified as an attenuation of a particular number of decibels of electromagnetic radiation that impinges on the user of the wireless device. Attenuation may be specific or differentiated per frequency range of electromagnetic radiation. Attenuation may be frequency-dependent. The particular number of decibels of attenuation may be about 25 dB, at least 25 dB, about 30 dB, about 40 dB, about 50 dB, about 60 dB, about 70 dB, about 80 dB, about 90 dB, about 100 dB, and/or other amount of decibels of attenuation. Shielding, by system 10, of electromagnetic radiation emitted by a wireless device may be quantified as an attenuation of a particular percentage of electromagnetic radiation that impinges on the user of the wireless device. The particular percentage may depend on the mode of operation of the wireless device, including but not limited to stand-by mode, download-mode, upload-mode, gaming mode, telephonic usage, and/or other modes of operation. The particular percentage may be about 50%, about 60%, about 70%, about 80%, about 85%, about 90%, about 95%, about 96%, about 97%, about 98%, and/or another percentage.

Measurements of the attenuation may include specific absorption rate (SAR) testing. Other types of testing may be contemplated within the scope of this disclosure. Measurements may be specific to a particular operating band, such as, by way of non-limiting example, GSM850. Measurements may pertain to electromagnetic radiation emitted by the front of a wireless device, by the back of a wireless device, at different distances from a user's head or ear (ranging from 1 inch, ½ inch, 15 mm, to zero inch), at varying levels of relative ambient humidity or ambient temperature, and/or taking other variable operating conditions into account.

System 10 may include one or more of a carrier structure 11, a receiver 14, a transmitter 13, and/or other components.

Carrier structure 11 may include one or more layers of material. The one or more layers of material may provide structural support to carry and/or protect receiver 14 and/or transmitter 13. In some implementations, system 10 may include separate carrier structures to carry receiver 14, transmitter 13, and/or other components of system 10. In some implementations, carrier structure 11 may include a laminate (e.g. including polyethylene) and/or other layer of plastic material. For example, receiver 14 and/or transmitter 13 may be encased and/or laminated in a layer of plastic material that functions as carrier structure 11. Carrier structure 11 may be configured to be removably installed on a wireless device. In some implementations, carrier structure 11 may be arranged and/or disposed at or near the back of a wireless device. For example, carrier structure 11 may be configured to fit between the wireless device and a protective cover and/or case of the wireless device, such as the cover of a smartphone.

In some implementations, a carrier structure as described herein may include a clear plastic layer, such as the clear plastic layer described and/or depicted in U.S. Patent Application Ser. No. 61/795,221, entitled "Caduceus-style coil with associated hardware that has applications in radiation reduction and production of longitudinal waves," and filed Oct. 13, 2012, which is hereby incorporated by reference into the present application in its entirety. This application is hereinafter referred to as "the '221 application."

In some implementations, one or more components of system 10 may include one or more layers of material such as the shielding materials described in U.S. patent application Ser. No. 13/658,679, entitled "SHIELDING CELL PHONE RADIATION," and filed Oct. 23, 2012, which is hereby incorporated by reference into the present application in its entirety. This application is hereinafter referred to as "the '679 application." For example, carrier structure 11 may include one or more layers of material having one or both of the properties of attenuating electromagnetic radiation through absorption and/or deflection such as the carbon-based microwave-absorbing fabric and/or the cobalt-alloy-coated RF-shielding fabric described in the '679 application.

Receiver 14 may be arranged and/or disposed at or near the back of a wireless device. Receiver 14 may be carried by carrier structure 11. In some implementations, receiver 14 and/or carrier structure 11 may include peripheral portions that may be arranged at or near one or more lateral sides (or segments thereof) of the wireless device. For example, as depicted (isometrically) in FIG. 1, receiver 14 includes peripheral portions 16 that may be arranged at or near lateral sides of a wireless device. One or more peripheral portions 16 may be folded at substantially transverse angels with the center of receiver 14 in such a manner that one or more peripheral portions 16 may be arranged to cover and/or be disposed at or near one or more lateral sides of the wireless device. In other words, a peripheral portion 16 may be folded over and/or around the side of a mobile telephone/smartphone. In some implementations, one or more lateral sides of the wireless device may be covered by one or more peripheral portions 16 in a manner such that predetermined types of components of the electronic device are uncovered, such as, by way of non-limiting example, buttons or antennas.

Receiver 14 may extend across a receiver width 14a and/or a receiver height 14b, as depicted in FIG. 1. Receiver width 14a may be about 1 inch, about 2 inches, about 2.5 inches, about 3 inches, about 4 inches, about 5 inches, about 6 inches, about 7 inches, about 8 inches, about 9 inches, about 10 inches, and/or another suitable width to cover a significant portion of a wireless device such as, by way of non-limiting example, a smartphone or tablet computing device. Receiver height 14b may be about 1 inch, about 2 inches, about 2.5 inches, about 3 inches, about 4 inches, about 5 inches, about 6 inches, about 7 inches, about 8 inches, about 9 inches, about 10 inches, and/or another suitable height to cover a significant portion of a wireless device. As depicted in FIG. 1, the width of carrier structure 11 may be similar to receiver width 14a, but this is exemplary and not intended to be limiting in any way.

Receiver 14 may be configured to receive electromagnetic radiation emitted by a wireless device. In some implementations, receiver 14 may include a metallic mesh. The granularity of the metallic mesh (i.e. the distance between threads within the mesh) is not limited by the depiction in FIG. 1. The distance may vary and/or range from about 0.005 inch to about 0.1 inch and/or any suitable distance therebetween.

Receiver 14 may be configured to convert received electromagnetic radiation into an electromagnetic signal. In some implementations, the metallic mesh included in receiver 14 may span across the width (and/or any other dimension) of the wireless device. In some implementations, receiver 14 may be opaque, such that it may be advisable to prevent covering components, including but not limited to a display and/or touchscreen, of the wireless device that present information to the user, in particular graphical information.

Transmitter 13 may be arranged and/or disposed at or near the back of a wireless device. Transmitter 13 may be carried by carrier structure 11. In some implementations, transmitter 13 and/or carrier structure 11 may include peripheral portions that may be arranged at or near one or more lateral sides (or segments thereof) of the wireless device. In some implementations, transmitter 13 and receiver 14 may be arranged and/or disposed at or near the same portion on a wireless device. As depicted in FIG. 1, in some implementations, transmitter 13 may be arranged and/or disposed above receiver 14. This depiction is not intended to be limiting in any way. In some implementations, transmitter 13 and receiver 14 may not overlap.

Transmitter 13 may be electrically coupled with receiver 14 such that one or more electrical couplings exist between transmitter 13 and receiver 14. Transmitter 13 may be configured to receive electromagnetic signals and/or electromagnetic radiation from receiver 14, e.g. through one or more electrical couplings. In some implementations, electrical couplings may be formed by soldering the metal mesh of receiver 14 to a wire of transmitter 13 (and/or via a conducive wire, not shown, to transmitter 13), and/or otherwise electrically coupling receiver 14 to transmitter 13. As depicted in FIG. 1, system 10 may include a first electrical coupling 18a and a second electrical coupling 18b. In some implementations, first electrical coupling 18a and second electrical coupling may be disposed at opposite ends of receiver 14. The number and location of electrical couplings shown in FIG. 1 is not intended to be limiting in any way.

Transmitter 13 may be configured to transmit electromagnetic signals and/or electromagnetic radiation. For example, transmitter 13 may be configured to transmit electromagnetic signals and/or electromagnetic radiation received by transmitter 13 from receiver 14. Transmitter 13 may be configured to transmit a longitudinal wave. In some implementations, transmitter 13 may be configured to convert received electromagnetic signals and/or electromagnetic radiation into a longitudinal wave.

Transmitter 13 may be configured to transmit electromagnetic signals and/or electromagnetic radiation in a particular direction. For example, the particular direction may be chosen such that transmissions from transmitter 13 may be substantially away from the user of the wireless device.

Transmitter 13 may include one or more electrically conducive wires. In some implementations, the transmitter includes one or more pairs of wires. As depicted in FIG. 1, transmitter 13 may include a pair 12 of twisted wires 19a and 19b. Individual ones of the pairs of wires may be twisted around each other. As depicted in FIG. 1 by magnification 12c, wire 19a and wire 19b of pair 12 may be twisted around each other. In some implementations, transmitter 13 may include one or more pairs of twisted wires.

Individual ones of the pairs of twisted wires may be spirally wound to form a coil. For example, the formed coil may be in a shape of a flat spiral. As depicted in FIG. 1, pair 12 may be spirally wound to form a coil 17. Coil 17 may be a so-called pancake coil and/or Tesla coil. Coil 17 may include a coil periphery 17b and a coil center 17a. Wires 19a and 19b may include wire ends 15a and 15b at or near coil periphery 17a. Wires 19a and 19b may include wire ends 15c and 15d at or near coil center 17a. In some implementations, wire end 15a and wire end 15c may both be included in wire 19a. In some implementations, wire end 15b and 15d may both be included in wire 19b.

In some implementations, transmitter 13 may include one or more coils. The shape of coil 17 may be circular, oval, triangular, rectangular, and/or any other polygonal shape.

Figure 4:
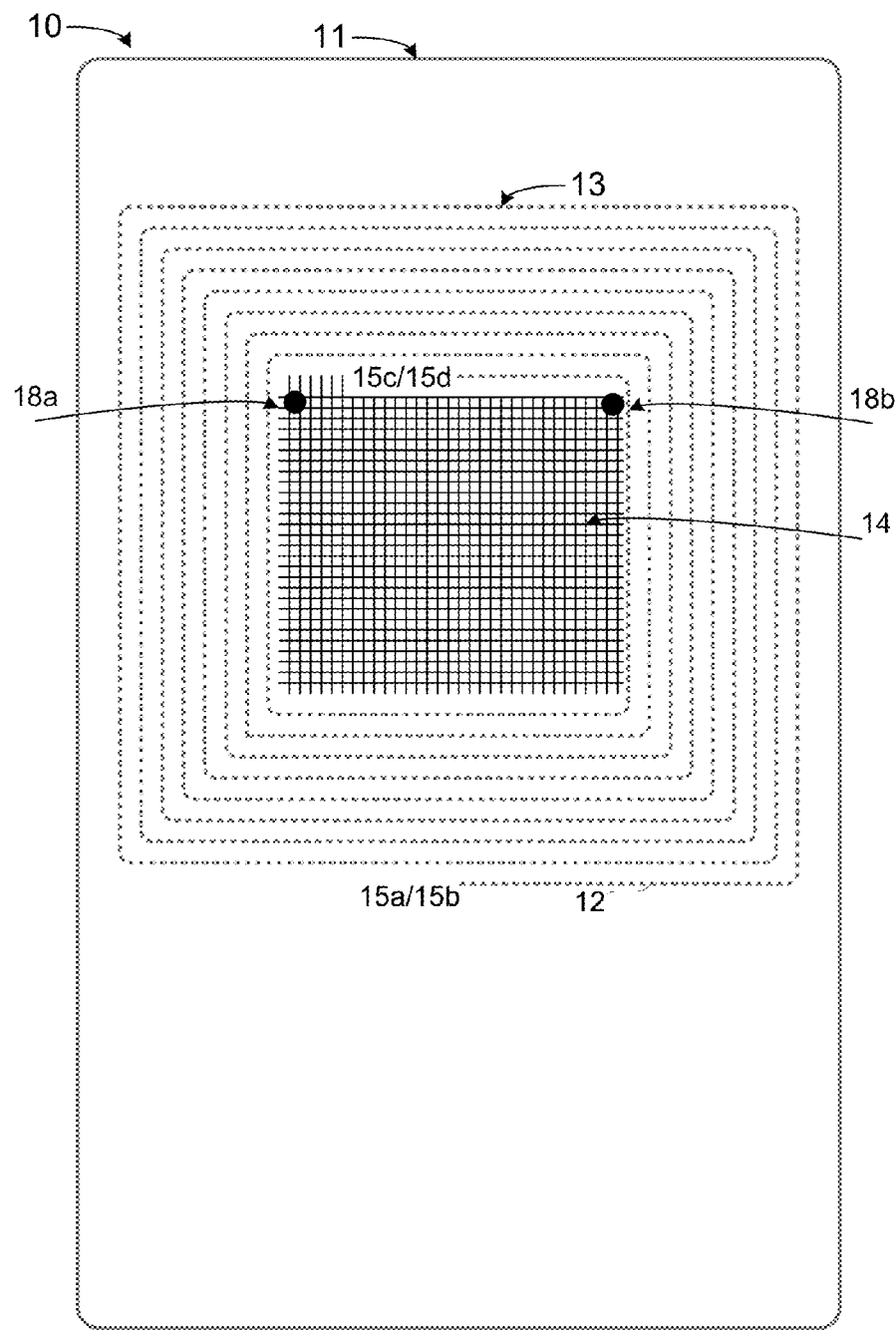
FIG. 4 schematically illustrates a system configured to shield electromagnetic radiation emitted from a wireless device.

By way of illustration, FIG. 4 schematically illustrates a system 10 configured to shield electromagnetic radiation using a rectangular transmitter 13 (formed by pair 12 of wires). Note that the individual wires within pair 12 are not depicted in FIG. 4. As depicted in FIG. 4, transmitter 13 may be arranged and/or disposed around receiver 14, and/or vice versa (not shown). In some implementations, areas covered by a receiver may be alternated with areas covered by one or more transmitters in various patterns. For example, the top and bottom third of the back of a wireless device may be covered by receivers (e.g. metallic meshes), and the center third of the back of the wireless device may be covered by one or more transmitters. Other patterns are contemplated within the scope of this disclosure.

Wire ends 15a, 15b, 15c, and 15d may be electrically coupled to each other and/or to the metallic mesh of receiver 14 (e.g. through electrical couplings 18a and/or 18b) in different ways or configurations. Individual configurations may have different electromagnetic properties. For example, in a first configuration, electrical coupling 18a may be electrically coupled to wire end 15a, electrical coupling 18b to wire end 15b, and wire end 15c to wire end 15d. For example, in a second configuration, electrical coupling 18a may be electrically coupled to wire end 15c, electrical coupling 18b to wire end 15d, and wire end 15a to wire end 15b. For example, in a third configuration, electrical coupling 18a may be electrically coupled to wire end 15c, electrical coupling 18b to wire end 15a, and wire end 15d to wire end 15b. For example, in a fourth configuration, electrical coupling 18a may be electrically coupled to wire end 15c, electrical coupling 18b to wire end 15d, and wire end 15a to wire end 15b. Within the described configurations, wire end 15a may be substituted for wire end 15b, and vice versa. Within the described configurations, wire end 15c may be substituted for wire end 15d, and vice versa. Within the described configurations, electrical coupling 18a may be substituted for electrical coupling 18b, and vice versa. Other configurations and permutations/combinations of electrical couplings are contemplated within the scope of this disclosure.

Figure 3:
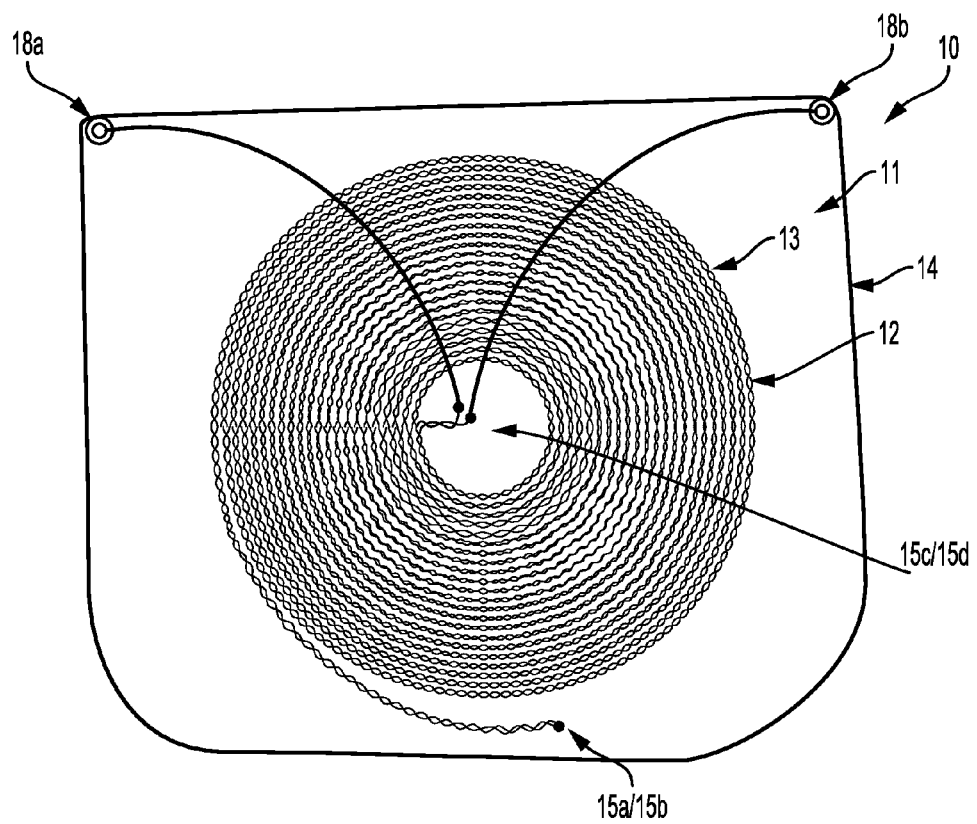
FIG. 3 illustrates an exemplary embodiment of a system configured to shield electromagnetic radiation emitted from a wireless device.

By way of illustration, FIG. 3 illustrates a system 10 configured to shield electromagnetic radiation in a manner similar to the fourth configuration, described above. Note that, as depicted in FIG. 3, receiver 14 may be arranged and/or disposed directly in front of or behind transmitter 13.

Coil 17 may have a coil width 17c. Coil width 17c may be about 1 inch, about 1.5 inch, about 2 inches, about 2.5 inches, about 3 inches, about 4 inches, about 5 inches, about 6 inches, about 7 inches, about 8 inches, about 9 inches, about 10 inches, and/or another suitable width.

Pair 12 of twisted wires may make a predetermined number or range of revolutions around coil center 17a to form coil 17. The predetermined number is not limited by the depiction in FIG. 1. The predetermined number of revolutions may be 2, about 5, about 10, about 15, about 20, about 30, about 50, about 100, and/or another suitable number of revolutions. The depictions in the '221 application are exemplary, and not intended to be limiting in any way.

Distance 12b between neighboring revolutions of pair 12 may vary and/or range from about 0.005 inch to about 0.5 inch and/or any suitable distance therebetween.

Figure 5:
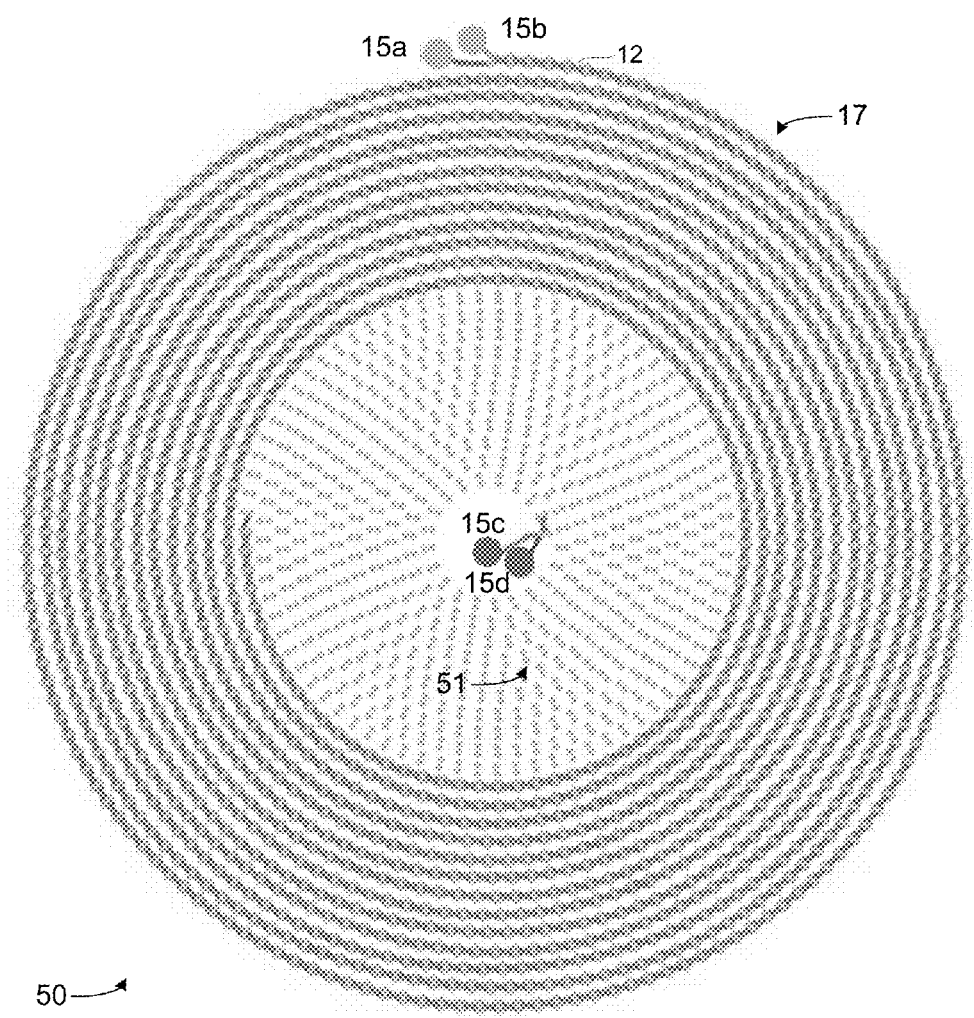
FIG. 5 illustrates a coil on a PCB board.

FIG. 5 illustrates coil 17 on a printed circuit board 50. Coil 17 may include a pair 12 of twisted wires. Fabricating coil 17 may be guided by PCB structures 51, which may be arranged in a spiral, as depicted in FIG. 5. Coil 17 may include wire ends 15a and 15b at the periphery of coil 17, and wire ends 15c and 15c at the center of coil 17. Coil 17 as depicted in FIG. 5 may be used in any embodiment of a system configured to shield electromagnetic radiation emitted by a wireless device, e.g. system 10 of FIG. 1.

FIG. 6 illustrates, through constituent FIGS. 6A, 6B, and 6C, exemplary details of a coil 17 in accordance with one or more embodiments. Dimensions in FIG. 6 are in inches. Coil 17 may have a coil width 17c of 2.00 inches as depicted in FIG. 6C. Pair 12 of twisted wires as depicted in FIG. 6A may be formed by folding a copper wire in half, and then twisting it with a 12.5 turns per inch ratio, to a total length of 86.00 inches as depicted in FIG. 6B. The copper wire may be 32 GA copper magnet wire. The spiral of coil 17 may be formed by a quantity of 23 turns and a 0.038 inch winding spacing. These numbers are exemplary and not intended to be limiting in any way. Other quantities of turns and other winding spacings are contemplated within the scope of this disclosure. In some implementations, the magnet wire varnish may be removed from the ends of wire 12, e.g. from 2 inch of each end.

FIG. 7 illustrates, through constituent FIGS. 7A, 7B, and 7C, an exemplary embodiment of a receiver 14, and/or details thereof. Dimensions in FIG. 7 are in inches. FIG. 7A illustrates an isometric view of an exemplary receiver 14. Receiver 14 may include a corner 72 having a 0.5 inch by 45 degree chamfer. Receiver 14 may include a structural detail 71 on one or more corners. As depicted in FIG. 7B, structural detail 71 may include, e.g., 3 through holes having a diameter of 0.01 inch each, and being spaced apart by 0.02 inch, as well as being spaced from the edge of receiver 14 by 0.02 inch. Receiver 14 may include a mesh, e.g. a copper woven wire cloth, having 0.0045 inch wire diameter. Meshes of different material, or including cloth having a different wire diameter, are contemplated within the scope of this disclosure.

FIG. 8 illustrates, through constituent FIGS. 8A and 8B, an exemplary embodiment of a receiver, and/or details thereof. Dimensions in FIG. 8 are in inches. FIG. 8A illustrates an isometric view of an exemplary receiver 14. Receiver 14 may include one or more structural details 71 on one or more corners that are the same as or similar to structural detail 71 in FIG. 7B/7C. Receiver 14 may include a mesh, e.g. a copper woven wire cloth, having 0.0045 inch wire diameter.

FIG. 9 illustrates, through constituent FIGS. 9A and 9B, an exemplary embodiment of a receiver, and/or details thereof. Dimensions in FIG. 9 are in inches. FIG. 9A illustrates an isometric view of an exemplary receiver 14. Receiver 14 may include one or more rounded corners 92. Receiver 14 may include one or more structural details 71 on one or more corners that are the same as or similar to structural detail 71 in FIG. 7B/7C. Receiver 14 may include a mesh, e.g. a copper woven wire cloth, having 0.0045 inch wire diameter.

Figure 10:
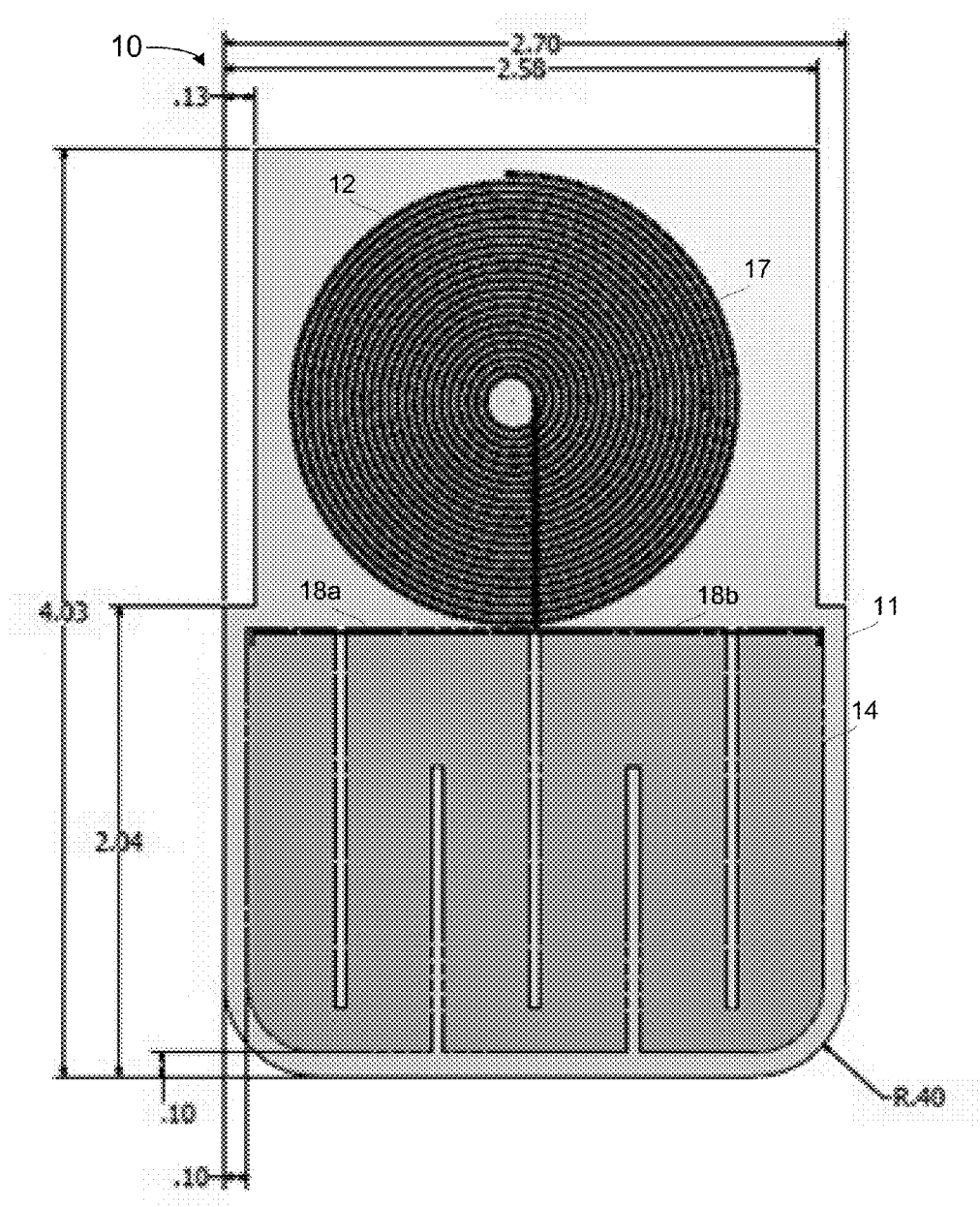
FIG. 10 illustrates an exemplary embodiment of a system configured to shield electromagnetic radiation emitted from a wireless device.

FIG. 10 illustrates an exemplary embodiment of a system 10 configured to shield electromagnetic radiation emitted from a wireless device. Carrier structure 11, coil 17 formed by pair 12 of twisted wires, and receiver 14 are depicted in FIG. 10. In some implementations, the coil may be similar to or the same as coil 17 of FIG. 6. In some implementations, the receiver may be similar to or the same as receiver 14 of FIG. 8. In some implementations, first electrical coupling 18a and second electrical coupling 18b may be coupled to the mesh of receiver along a distance of about 0.5 inch, about 1 inch, about 1.5 inch, and/or another suitable distance.

Figure 2:
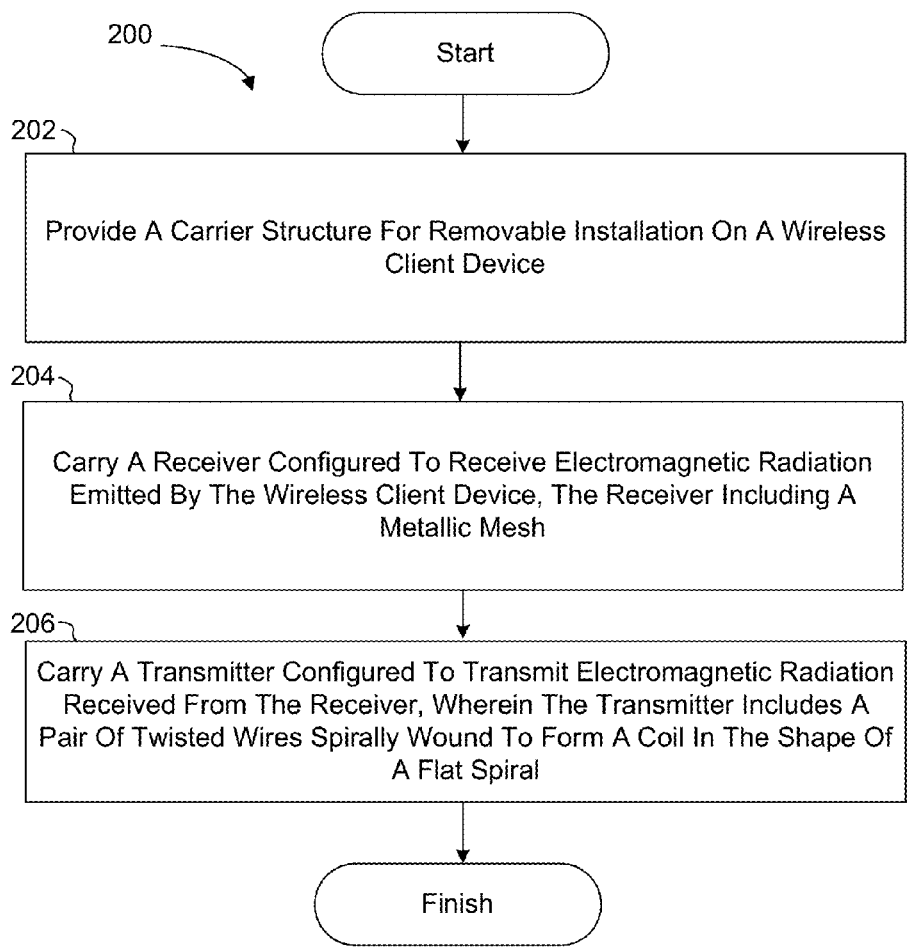
FIG. 2 illustrates a method to shield a user from electromagnetic radiation emitted by a wireless device.

FIG. 2 illustrates a method 200 to shield a user from electromagnetic radiation emitted by a wireless device. The operations of method 200 presented below are intended to be illustrative. In certain implementations, method 200 may be accomplished with one or more additional operations not described, and/or without one or more of the operations discussed. Additionally, the order in which the operations of method 200 are illustrated in FIG. 2 and described below is not intended to be limiting.

At an operation 202, a carrier structure is provided for removable installation on a wireless device. In one implementation, operation 202 is performed by a carrier structure similar to or substantially the same as carrier structure 11 (shown in FIG. 1 and described above).

At an operation 204, a receiver is carried by the carrier structure. The receiver is configured to receive electromagnetic radiation emitted by the wireless device. The receiver includes a metallic mesh. In one implementation, operation 204 is performed by the carrier structure and a receiver similar to or substantially the same as carrier structure 11 and receiver 14 (shown in FIG. 1 and described above).

At an operation 206, a transmitter is carried by the carrier structure. The transmitter is configured to transmit electromagnetic radiation received from the receiver. The transmitter includes a pair of twisted wires spirally wound to form a coil in the shape of a flat spiral. In one implementation, operation 206 is performed by a carrier structure and a transmitter similar to or substantially the same as carrier structure 11 and transmitter 13 (shown in FIG. 1 and described above).

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system configured to shield a user from electromagnetic radiation emitted by a wireless client device having a front side and a backside, the system comprising:

a carrier structure configured to be removably installed on the wireless client device;

a receiver carried by the carrier structure such that the receiver is disposed near the back side of the wireless client device responsive to the carrier structure being installed on the wireless client device, the receiver being configured to receive electromagnetic radiation emitted by the wireless client device, wherein the receiver includes a metallic mesh, and wherein the receiver includes a first electrical coupling and a second electrical coupling; and a transmitter carried by the carrier structure, the transmitter being coupled with the receiver, and being configured to transmit electromagnetic radiation received from the receiver, and wherein the transmitter includes a pair of twisted wires, the pair of twisted wires being spirally wound to form a coil in a shape of a flat spiral having a periphery and a center, wherein the pair of twisted wires includes a first wire and a second wire, wherein the first wire includes a first inner wire end at the center of the flat spiral and a first outer wire end at the periphery of the flat spiral, wherein the second wire includes a second inner wire end at the center of the flat spiral and a second outer wire end at the periphery of the flat spiral, wherein the first electrical coupling of the receiver is coupled to the first inner wire end, wherein the second electrical coupling of the receiver is coupled to the second inner wire end, and wherein the first outer wire end is coupled to the second outer wire end.

2. The system of claim 1, wherein the wireless client device includes a mobile telephone.

3. The system of claim 1, wherein the electromagnetic radiation has a predominant range of frequencies between about 400 MHz and about 2.5 GHz.

4. The system of claim 1, wherein the transmitter is configured to receive the electromagnetic radiation from the receiver through one or more electrical couplings.

5. The system of claim 1, wherein the receiver is arranged to be disposed near a lower region of the back of the wireless client device.

6. The system of claim 1, wherein the transmitter is arranged to be disposed above the receiver.

7. The system of claim 1, wherein one or more peripheral portions of the carrier structure are arranged at substantially transverse angles with a center of the receiver, and wherein one or more peripheral portions are disposed near one or more lateral sides of the wireless client device.

8. A method to shield a user from electromagnetic radiation emitted by a wireless client device having a front side and a backside, the method comprising:
providing a carrier structure for removable installation on the wireless client device; carrying, by the carrier structure, a receiver such that the receiver is disposed near the back side of the wireless client device, wherein the receiver is configured to receive electromagnetic radiation emitted by the wireless client device, the receiver including a metallic mesh, and wherein the receiver includes a first electrical coupling and a second electrical coupling; and
carrying, by the carrier structure, a transmitter such that the transmitter is disposed near the back side of the wireless client device, wherein the transmitter is configured to be coupled with the receiver, wherein the transmitter is configured to transmit electromagnetic radiation received from the receiver, and wherein the transmitter includes a pair of twisted wires, the pair of twisted wires being spirally wound to form a coil in the shape of a flat spiral having a periphery and a center, wherein the pair of twisted wires includes a first wire and a second wire, wherein the first wire includes a first inner wire end at the center of the flat spiral and a first outer wire end at the periphery of the flat spiral, wherein the second wire includes a second inner wire end at the center of the flat spiral and a second outer wire end at the periphery of the flat spiral,
wherein the first electrical coupling of the receiver is coupled to the first inner wire end, wherein the second electrical coupling of the receiver is coupled to the second inner wire end, and wherein the first outer wire end is coupled to the first inner wire end.

9. A system configured to shield a user from electromagnetic radiation emitted by a wireless client device having a front side and a backside, the system comprising:
a carrier structure configured to be removably installed on the wireless client device;
a receiver carried by the carrier structure such that the receiver is disposed near the back side of the wireless client device responsive to the carrier structure being installed on the wireless client device, the receiver being configured to receive electromagnetic radiation emitted by the wireless client device, wherein the receiver includes a metallic mesh, and wherein the receiver includes a first electrical coupling and a second electrical coupling; and
a transmitter carried by the carrier structure, the transmitter being coupled with the receiver, and being configured to transmit electromagnetic radiation received from the receiver, and wherein the transmitter includes a pair of twisted wires, the pair of twisted wires being spirally wound to form a coil in a shape of a flat spiral having a periphery and a center, wherein the pair of twisted wires includes a first wire and a second wire, wherein the first wire includes a first inner wire end at the center of the flat spiral and a first outer wire end at the periphery of the flat spiral, wherein the second wire includes a second inner wire end at the center of the flat spiral and a second outer wire end at the periphery of the flat spiral,
wherein the first electrical coupling of the receiver is coupled to the first inner wire end and, wherein the second electrical coupling of the receiver is coupled to the first outer wire end, and wherein the second outer wire end is coupled to the second inner wire end.

* * * * *